United States Patent [19]

Pienta

[11] Patent Number: 4,610,592
[45] Date of Patent: Sep. 9, 1986

[54] ROBOTIC DOWNENDER APPARATUS

[75] Inventor: David J. Pienta, Temperance, Mich.

[73] Assignee: Automatic Handling & Fabrication, Inc., Erie, Mich.

[21] Appl. No.: 689,470

[22] Filed: Jan. 7, 1985

[51] Int. Cl.$^4$ .............................................. B65G 57/28
[52] U.S. Cl. .................................. 414/38; 294/103.2; 414/80; 414/110
[58] Field of Search ...... 294/67 AA, 86 LS, 103 CG; 414/38, 639, 672, 785, 911, 910, 784, 684, 783, 80, 110

[56] References Cited

U.S. PATENT DOCUMENTS

| | | | |
|---|---|---|---|
| 3,050,198 | 8/1962 | Schmunk et al. | 414/110 X |
| 3,434,602 | 3/1969 | Vann, III | 414/784 |
| 3,627,147 | 12/1971 | Yowell et al. | 414/784 |
| 3,831,782 | 8/1974 | Werntz | 414/110 X |
| 3,941,255 | 3/1976 | Wolf | 414/784 |
| 4,102,460 | 7/1978 | Pryor et al. | 414/80 X |

FOREIGN PATENT DOCUMENTS

| | | | |
|---|---|---|---|
| 1093326 | 5/1955 | France | 414/684 |
| 52-18663 | 2/1977 | Japan | 414/783 |

Primary Examiner—Leslie J. Paperner
Assistant Examiner—Janice Krizek
Attorney, Agent, or Firm—Emch, Schaffer, Schaub & Porcello Co.

[57] ABSTRACT

An improved downender assembly and method for using the assembly is disclosed. The improved downender apparatus has a load receiving member which is rotatable from a horizontal orientation for receiving unit loads from a conveyor assembly to a vertical orientation for placing the unit loads in a vertically stacked position. The end member of the downender assembly is pivotally movable from beneath the vertically stacked units and flexes to maintain parallel and flush contact with the bottom of such units, thereby preventing unnecessary damage to the units.

8 Claims, 8 Drawing Figures

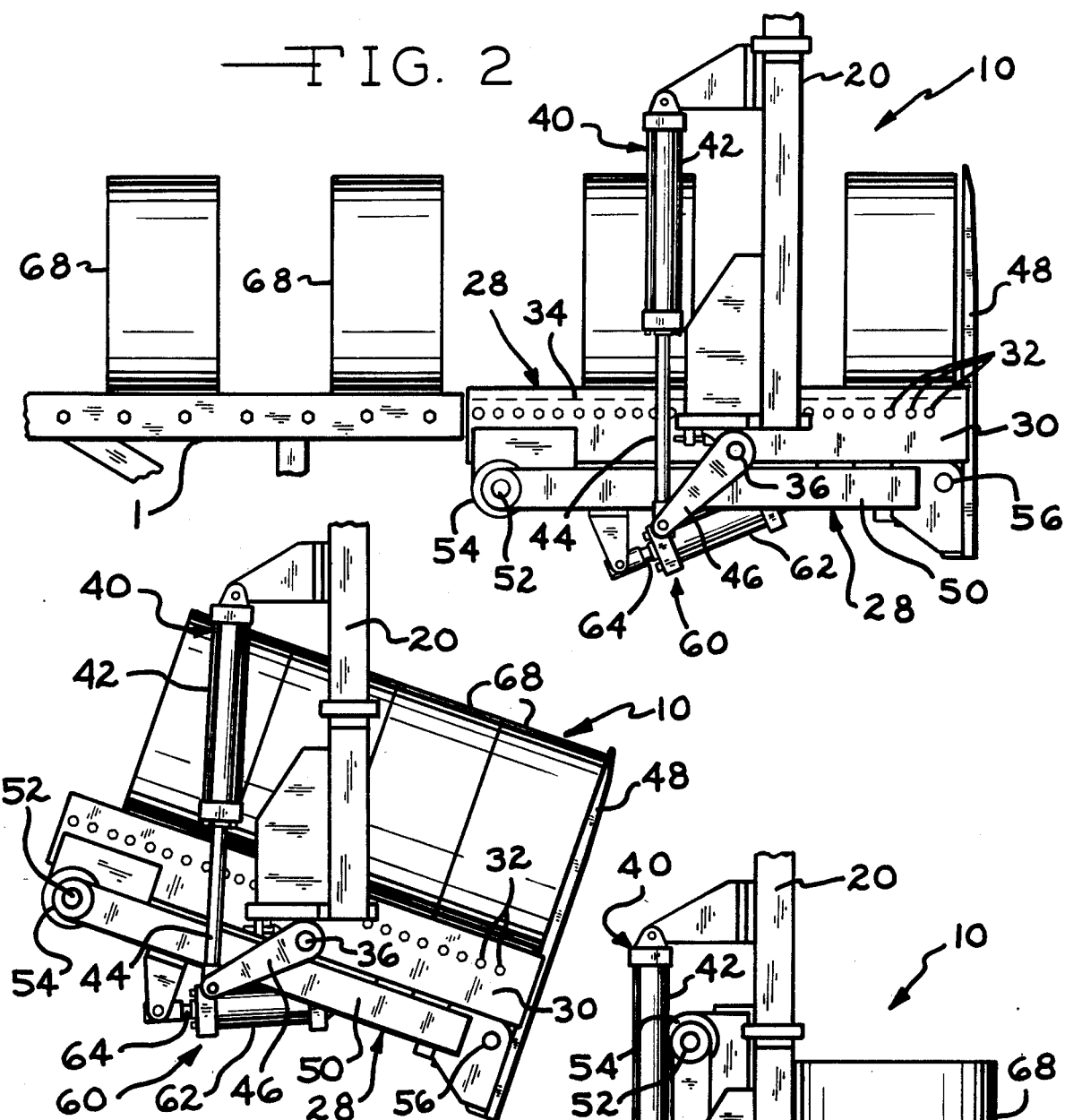
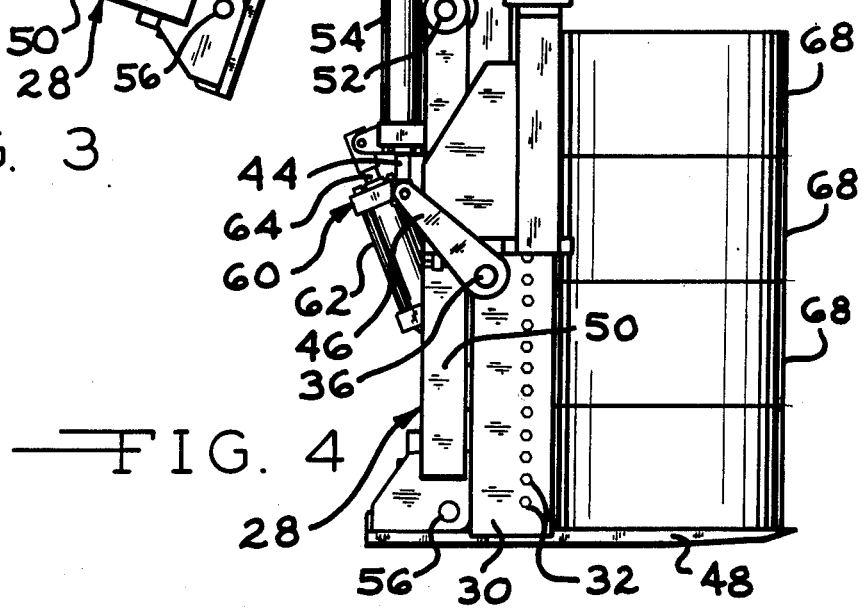

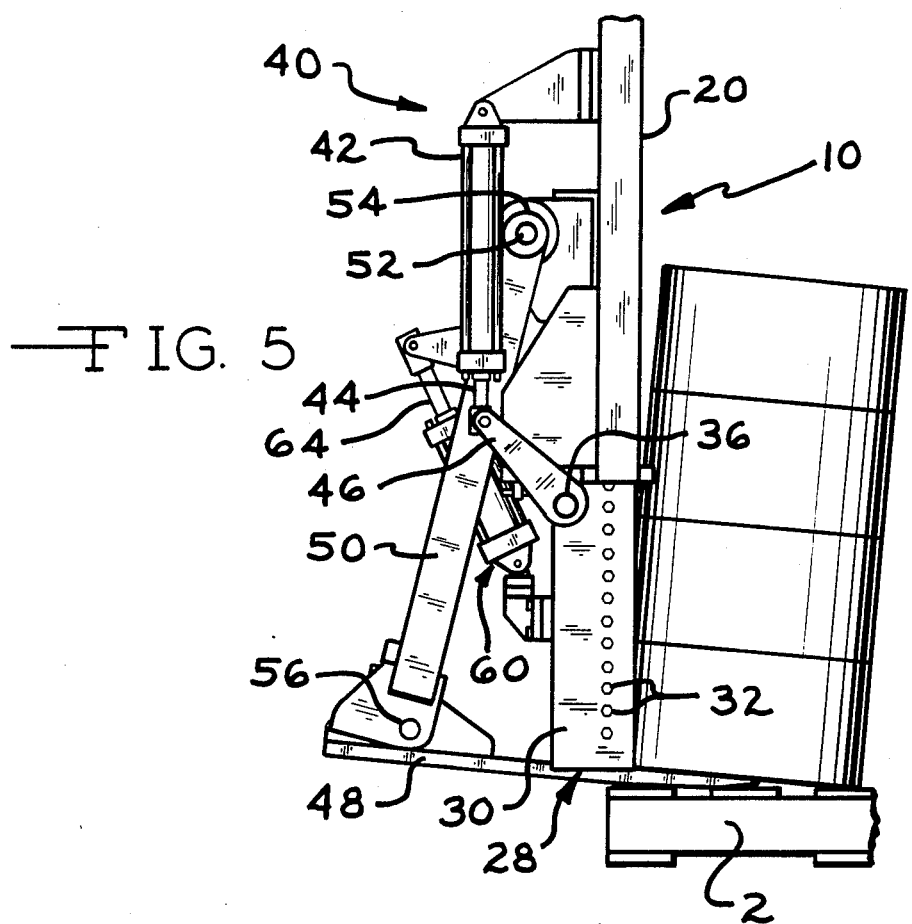

ROBOTIC DOWNENDER APPARATUS

BACKGROUND OF THE INVENTION

The present invention relates to an improved method and apparatus in a downender assembly for receiving unit loads, such as paper rolls, from a manufacturing assembly line and placing those unit loads in vertical stacks. The present invention provides an improved method and apparatus which facilitates ease of movement of the unit loads and minimizes damage caused to the unit loads by the handling process.

There are many distinct methods currently practiced for receiving unit loads from, for example, manufacturing conveyor assemblies and placing those unit loads in storage or shipping. One obvious method is to manuallly stack the unit loads on a pallet as they exit from the conveyor assembly. The pallet containing the stacked unit loads is then transported and placed in the appropriate storage position or shipping position by means of a forklift or overhead crane. Another solution includes the manual placement of the unit loads on a flatbed forklift, transporting the stack of unit loads to a pallet or storage area and removing the forklift support from the bottom. These solutions are undesirable when working with heavy, unwieldy unit loads or fragile unit loads which may sustain damage in transportation.

Other systems include the placement of an overhead crane and hoist to lift the unit loads from the conveyor assembly and stack the unit loads individually in their desired location. For units such as manufactured paper rolls, which are rolled upon a hollow core, some apparatus have used a tine assembly which inserts into the hollow core or an element which is placed into the interior of the core and expands to contact the paper roll.

None of these methods and apparatus has proven entirely satisfactory for use in handling different sizes and shapes of unit loads as well as providing for efficient vertical stacking. Demand is present for an improved downender apparatus and method which can, for example, receive unit loads from a conveyor assembly or from a transport and stack the unit loads with minimum damage to the unit loads. The system should be adaptable to many different items of unit loads. The present method and apparatus achieve these desired goals.

SUMMARY OF THE INVENTION

The present invention provides a downender apparatus and method for using the apparatus in receiving unit loads from a conveyor assembly and placing those unit loads in desired stacks in a desired location within a manufacturing facility. The invention includes a load receiving member which is rotatable between a substantially horizontally oriented position and a substantially vertically oriented positon. The load receiving member has a conveyor surface which, when placed in the horizontally oriented position, can be located contiguous to the end of the manufacturing conveyor assembly. The unit loads are passed from the manufacturing conveying assembly to the conveying surface of the load receiving member. An end member is located at the far end of the load receiving member for use in providing a stop means for the unit loads as they are passed from the conveyor assembly on to the horizontally positioned load receiving member. After the desired number of unit loads have been loaded onto the load receiving member, a hydraulic ram is activated to rotate the load receiving member from the horizontal orientation to its substantially vertical orientation. In this position, the end member serves as a bottom support for the now vertically stacked unit loads. The vertically oriented load receiving member, carrying the vertically stacked unit loads, is maneuvered by the supporting apparatus, such as an overhead crane, to the desired location for placement of the vertical stack of unit loads. To complete placement of the vertical stack of unit loads on a pallet for shipping or on the floor of the storage area, the end member is designed to be laterally withdrawn from underneath the vertically stacked unit loads.

The end member is supported by a frame member which is pivotally attached to the load receiving member. A hinge assembly attaches the end member to the frame member and a shock absorber bungee is located at the hinge member to allow the end member to flex with respect to the frame member and return to center.

A second ram member is positioned between the load receiving member and the frame member and acts to extend the frame member outwardly from the load receiving member, thereby pulling the end member laterally out from under the vertically stacked units. As the frame member rotates, the end member flexes through the hinge joint and the shock absorber bungee to maintain parallel and flush contact with the bottom of the vertically stacked unit loads. After the end member has been removed from underneath the unit loads, the downender apparatus of the present invention is available to begin the process over again.

The following description of the drawings will describe a preferred embodiment of the invention but is not intended to be limiting upon the scope and content of the claims, which follow.

BRIEF DESCRIPTION OF THE DRAWINGS

FIG. 2 shows the downender apparatus of the present invention in its horizontally oriented position contiguous to the end of the conveyor apparatus.

FIG. 3 shows the downender apparatus of the present invention being rotated from its horizontal orientation to its vertical orientation.

FIG. 4 shows the downender apparatus of the present invention in its vertical orientation.

FIG. 5 shows the end member of the downender apparatus being removed from beneath the stack of unit loads.

FIG. 6 shows the movement of the end member of the downender apparatus as a result of the shock absorber bungee.

DETAILED DESCRIPTION OF THE PREFERRED EMBODIMENT

The present invention provides an improved downender apparatus and method for using the downender apparatus to receive unit loads from a manufacturing conveyor assembly and place those unit loads in vertical stacks for shipping or storage.

Figure 1:
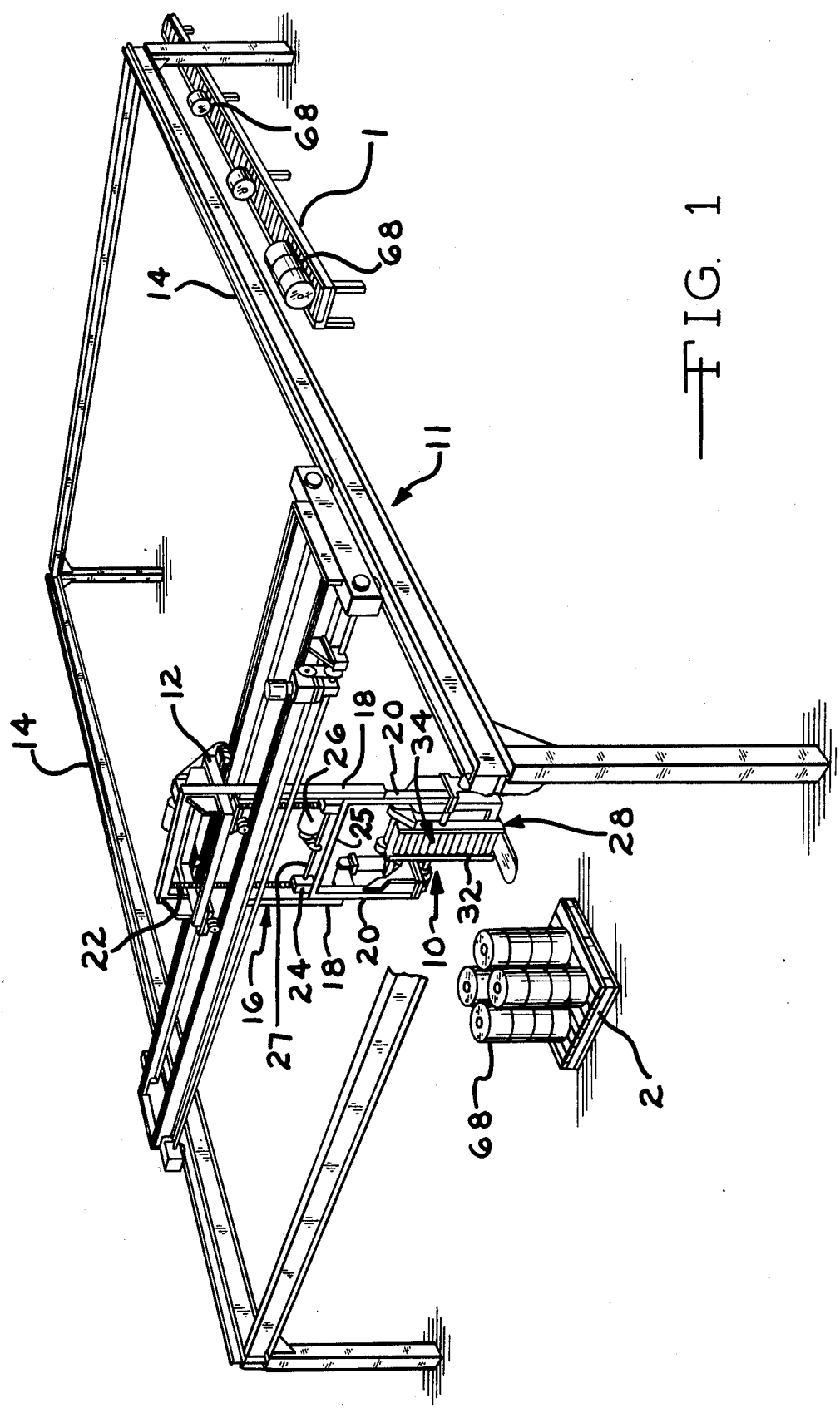
FIG. 1 shows an overall system of the present invention including the support apparatus—overhead crane used to move the downender apparatus of the present invention.

Referring to FIG. 1, a downender apparatus 10, according to the present invention is shown. Support structure 11 for the downender apparatus 10 comprises an overhead crane 12 supported on rails 14. The overhead crane 12 is capable of movement on both the X and Y axes, therefore providing accessibility to any location within the perimeter of the support structure 10.

While the present embodiment downender of the apparatus 10 includes an overhead support apparatus, the invention also includes, for example, a downender apparatus having a fixed location where a conveyor mechanism or other mechanism transports unit loads to the fixed downender apparatus for handling.

A support frame 16 of the downender apparatus is attached to the overhead crane 12. The support frame 16 consists of two members 18 which extend downwardly from the overhead crane 12. Support rails 20 are engaged with the members 18 and provide for vertical movement with respect to the members 18. In the present embodiment, vertical screws 22 are mounted adjacent the members 18 and a drive gear 24 is mounted on a crossrail 25 extending between the support rails 20. A motor 26 mounted on the crossrail 25 drives a shaft 27 having gears 24 mounted at its outer ends. The gears 24 engage the screws 22. Rotation of the shaft 27 and the gears 24 drive the support rails 20 vertically with respect to the members 18.

Figure 7:
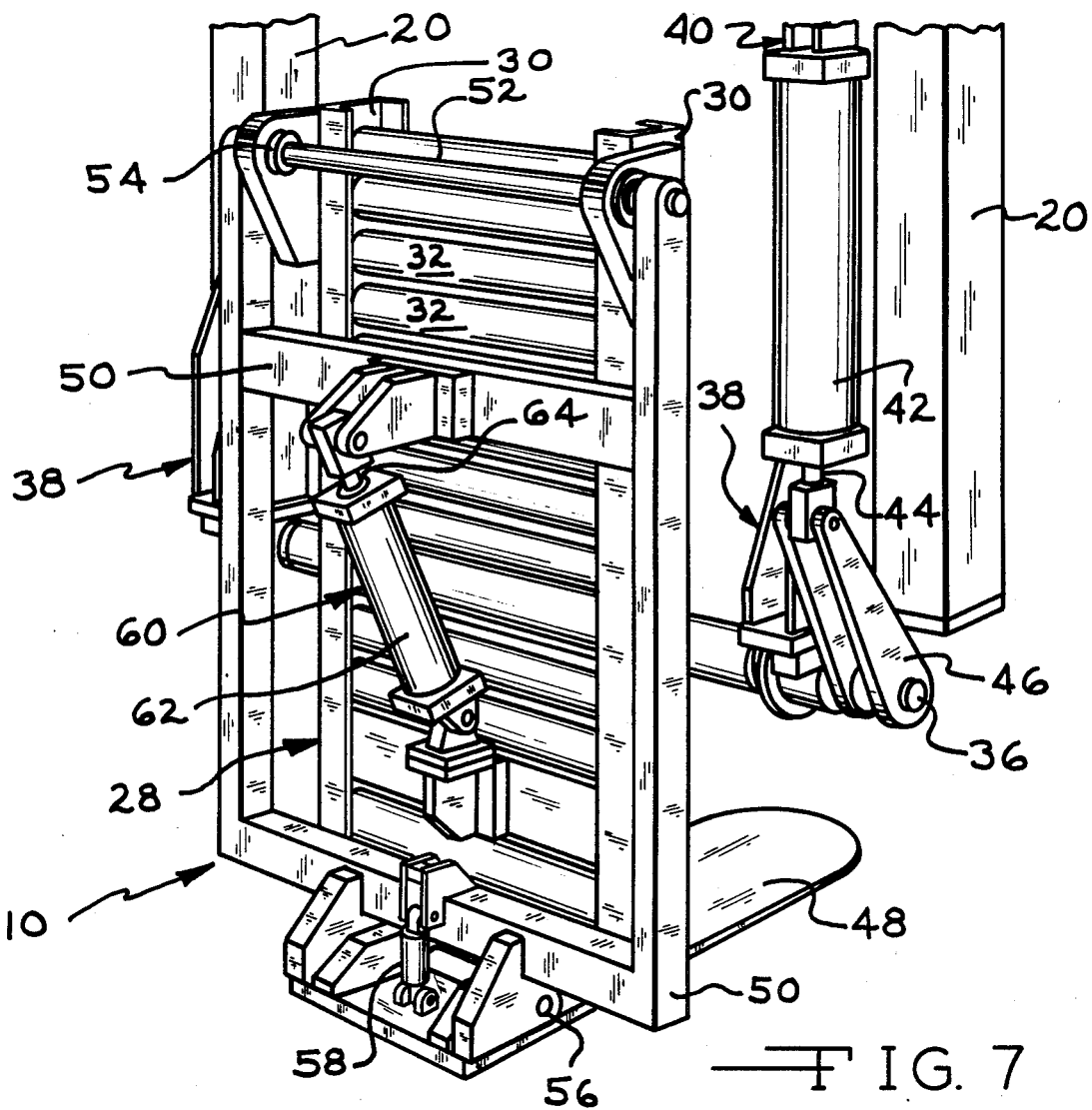
FIG. 7 shows the detailed drawings of the ram members used to rotate the load receiving member and the frame assembly.

Referring now to FIGS. 2–4, the downender apparatus 10 of the present invention will be described in detail. A load receiving member 28 is mounted between the support rails 20. The load receiving member 28 in the present embodiment is a conveyor unit including two parallel angles 30 which mount a plurality of independently rotating rollers 32. The rollers 32 define a conveying surface 34. The load receiving member 28 is mounted on the support rails 20 by means designed to provide rotational freedom of movement to the load receiving member 28 between a horizontally oriented position and a vertically oriented position. Referring to FIG. 7, the rotating mounting includes a shaft 36 supported by gusset assemblies 38 extending from the support rails 20. The shaft 36 extends through the angles 30 of the load receiving member 28. The load receiving member 28 rotates with the shaft 36 with respect to the support rails 20.

In the preferred embodiment, a hydraulic ram 40, having a cylinder casing 42 and a piston rod 44 is fixed to one of the support rails 20. The piston rod 44 of the hydraulic ram 40 engages a lever arm assembly 46 which, in turn, is fixed to the shaft 36 and operatively to the load receiving member 28. The hydraulic ram 40 receives its control input from an operator control box (not shown). In the preferred embodiment, as the piston rod 44 extends from the cylinder casing 42 the load receiving member 28 is rotated to its horizontal orientation. As the piston rod 44 retracts into the cylinder casing 42, the load receiving member 28 rotates into its vertical orientation.

An end member 48, designed to extend perpendicularly above the conveying surface 34 is located proximate one end of the load receiving member 28. The end member 48 is supported by a rectangular frame assembly 50 which in turn is mounted on the load receiving member 28. In the preferred embodiment, the frame assembly 50 is mounted for rotation with the load receiving member 28 by means of a shaft 52 and a set of support bearings 54. The frame assembly 50 is designed to move outwardly from the load receiving member 28 by pivoting on the shaft 52 and the support bearings 54, thereby moving the end member 48 away from the conveying surface 34. Referring now to FIGS. 5 and 6, the frame assembly 50 is shown being moved outwardly from its juxtaposed position with the load receiving member 28.

Figure 8:
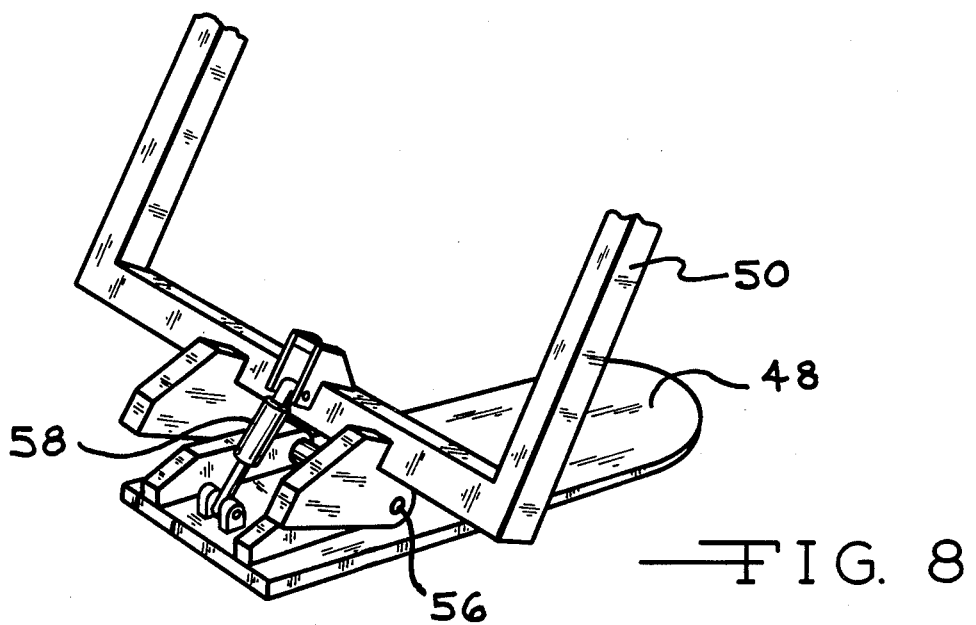
FIG. 8 is a detailed drawing showing the shock absorber bungee of the present invention.

The end member 48 is supported by the frame assembly 50 by means of a hinge joint 56. Referring to FIG. 8, the hinge joint 56 is shown in detail. A shock absorber bungee 58 is interconnected between the frame member 50 and the end member 48, thereby allowing the end member 48 to flex with respect to the frame member 50 as the frame member/end member combination moves outwardly away from the load receiving member 28, as shown in FIGS. 5 and 6. The flexibility of the end member, through the hinge joint 56 and shock absorber bungee 58, allows the end member 48 to be removed from beneath the vertical stack of unit loads and yet continue to maintain parallel and flush contact with the bottom of the vertically stacked unit loads, thereby preventing damage to the edges of the unit loads.

A hydraulic ram 60 having a cylinder casing 62 and piston rod 64 is engaged between the load receiving member 28 and the frame assembly 50. The hydraulic ram 60 receives its control input from the operator control box (not shown). As the piston rod 64 extends from the cylinder casing 62, the frame assembly 50 is pivoted on the shaft 52 and support bearings 54. The lower end of the frame assembly 50 is moved outwardly from the load receiving member 28, thereby removing the end member 48 from beneath the vertically stacked unit loads. Retraction of the piston rod 64 returns the frame assembly 50 to its juxtaposed position with the load receiving member 28 and places the end member 48 in its perpendicular orientation with respect to the conveying surface 34 of the load receiving member 28.

The operation of the improved downender apparatus 10 of the present invention will now be described. Referring to FIG. 2, the load receiving member 28 is placed in a horizontally oriented position by extending the piston rod 44 of the hydraulic ram 40. The horizontally oriented load receiving member 28 is positioned by the support frame 16 contiguous to, for example, the end of a manufacturing conveyor assembly 1. Unit loads, for example, paper rolls 68 are transferred from the manufacturing conveyor assembly 1 to the conveying surface 34 of the load receiving member 28. The end member 48 prevents the unit loads 68 from unloading from the opposed end of the load receiving member 28.

Referring now to FIGS. 3 and 4, after the desired number of unit loads 68 are placed on the conveying surface 34 of the load receiving member 28, the piston rod 44 is retracted into the cylinder casing 42 of the first hydraulic ram 40 thereby rotating the load receiving member 28 from its horizontally oriented position to a substantially vertically oriented position. In the substantially vertically oriented position, the end member 48 provides support for the unit loads 68, which are now positioned in a vertical stack.

The vertically oriented downender apparatus supporting the vertical stack of unit loads 68 is transported by the overhead crane 12 on the support structure 10 to a desired location for shipping or storage. Referring to FIGS. 5 and 6, the vertical stack of unit loads 68 is placed, for instance, on a pallet 2. By activating the hydraulic ram 60 and causing the piston rod 64 to extend from the cylinder casing 62, the frame assembly 50 pivots with respect to the load receiving member 28 and removes the end member 48 from beneath the vertically stacked unit loads. The end member 48 flexes on the hinge joint 56 to maintain flush contact with the bottom of the unit loads and laterally withdraw, thereby preventing damage to the edges of the unit loads 68. After the end member 48 is completely removed from beneath the unit loads, the shock absorber bungee 58 re-orients the end member 48 back to a center or perpendicular position.

The foregoing description of the preferred embodiment was for illustrative purposes and is not intended to be limiting upon the various embodiments which can be interpreted from the scope and content of the following claims.

What I claim is:

1. An improved downender apparatus comprising, in combination:
   means for receiving a plurality of unit loads;
   means for moving said receiving means and such unit loads between a horizontal position and a vertical position;
   means for holding such unit loads when in such vertically stacked position; and,
   means for removing said holding means from said unit loads, thereby leaving such unit loads in a vertically stacked position, said receiving means defining a planar surface, said holding means comprising an end member positioned substantially perpendicular to such planar surface of said receiving means and a frame assembly connected to said end member and pivotally connected to said receiving means, said removing means including a cylinder interconnected between said frame assembly and said receiving means for moving said frame assembly and said end member from a first position proximate said receiving means to a second position spaced from said receiving means, said end member being connected to said frame assembly by a hinge assembly, and a shock absorbing member positioned between said end member and said frame assembly, whereby said end member pivots with respect to said frame assembly as said frame member and said end member are moved outwardly from such first position to such second position spaced from said receiving means.

2. The downender apparatus of claim 1, support means connected to said receiving means for supporting said receiving means, said receiving means including a load receiving member having a conveying surface, said load receiving member being pivotally mounted on said support means for rotation between a substantially horizontal orientation and a substantially vertical orientation.

3. The downender apparatus of claim 2, wherein said receiving means includes a cylinder interconnected between said support means and said load receiving member for pivoting said load receiving member from such horizontal orientation to such vertical orientation.

4. The downender apparatus of claim 1, wherein said planar surface comprises a conveying surface including a plurality of independently rotating rollers.

5. An improved downender apparatus comprising, in combination,
   receiving means defining a planar conveyor surface for receiving a plurality of unit loads, said planar surface being generally rectangular,
   a generally rectangular support frame positioned adjacent and behind said receiving means, said support frame being pivoted adjacent its upper end to said receiving means and pivotally mounting an outwardly extending end member adjacent its lower end for supporting such unit loads, said end member extending generally perpendicularly from said rectangular support frame,
   first cylinder means for rotating said planar surface of said receiving means between a substantially horizontal orientation and a substantially vertical orientation,
   second cylinder means attached to said support frame for moving said lower end of said support frame rearwardly relative to said planar surface, whereby said end member is also drawn rearwardly to deposit such unit loads supported on said end member adjacent said vertically oriented planar surface and hinge means between said support frame and said end member whereby said end member may rotate relative to said support frame as it is drawn rearwardly.

6. The downender apparatus of claim 5, wherein said planar conveyor surface includes a plurality of independently rotating rollers.

7. The downender apparatus of claim 5, including support means connected to said rectangular receiving means, said first cylinder means being operatively connected to said support means.

8. The downender apparatus of claim 5, including a shock absorbing member positioned between said end member and said support frame.

* * * * *